United States Patent
Kulkaski et al.

(10) Patent No.: US 9,453,310 B1
(45) Date of Patent: Sep. 27, 2016

(54) EXTRUDABLE RUBBER COMPONENT PRODUCTS

(71) Applicant: K. Jabat, Inc., Green Brook, NJ (US)

(72) Inventors: David Kulkaski, Piscataway, NJ (US); Thomas D. Simmering, Boonville, IN (US)

(73) Assignee: K. Jabat Inc., Greenbrook, NJ (US)

( * ) Notice: Subject to any disclaimer, the term of this patent is extended or adjusted under 35 U.S.C. 154(b) by 272 days.

(21) Appl. No.: 13/998,088

(22) Filed: Sep. 30, 2013

(51) Int. Cl.
*C08L 47/00* (2006.01)
*E01F 9/04* (2006.01)

(52) U.S. Cl.
CPC . *E01F 9/04* (2013.01); *C08L 47/00* (2013.01)

(58) Field of Classification Search
CPC ........................................ C08L 47/00
USPC ........................................ 524/525
See application file for complete search history.

(56) References Cited

U.S. PATENT DOCUMENTS

| 7,179,016 B2 | 2/2007 | Riker | |
| 7,510,346 B2 | 3/2009 | Riker | |
| 2004/0127644 A1* | 7/2004 | Jacob et al. | C08F 297/04 205/98 |

\* cited by examiner

*Primary Examiner* — Edward Cain
(74) *Attorney, Agent, or Firm* — Alvin T. Rockhill

(57) ABSTRACT

Road markers, highway delineators and other products are manufactured from a compounded mixture of polymers and pulverized or micronized rubber powder, using a multi-layer plastic extrusion process on industry standard plastic extrusion equipment. The compound retains shape and includes a mixture of natural and synthetic rubbers, carbon black, fillers and oils; a propylene-based elastomer; a mixture of light color aliphatic hydrocarbon resins, and linear low density polyethylene.

20 Claims, 2 Drawing Sheets

EXTRUDABLE RUBBER COMPONENT PRODUCTS

CROSS-REFERENCE TO RELATED APPLICATIONS

This application claims priority of U.S. Provisional Application Ser. No. 61/797,042, filed Nov. 29, 2012.

BACKGROUND OF THE INVENTION

1. Field of the Invention

The present invention is related to materials and compounds using micronized or pulverized rubber powder as a component to enhance the physical properties or reduce cost of finished products such as tubes or flat strips in highway delineators, road markers, line markers, and Port-A-John vent tubes.

2. Description of Related Art

There are a number of highway delineator patents which disclose form, fit, and function inventions. These patents (listed below) disclose mixtures of specific thermosetting/thermoplastic combinations such as HYTREL®, a line of thermoplastic polyester elastomers offered by DuPont® which provide the flexibility of rubbers, the strength of plastics, and the process ability of thermoplastics. One patent is calling for the incorporation of DuPont® Kevlar® aramid fiber into the matrix. None of the below listed patents, regardless of the shape and mix of materials involved; disclose micronized rubber powder incorporated into the material mix.

There have been a number of roadway or highway guide or marking posts which are constructed either of a flexible material or are spring biased based in order to be self erecting in the event the delineator or marking post is accidentally hit and bent by a moving vehicle which leaves the roadway. For example, U.S. Pat. Nos. 4,084,914, 4,092,081, 4,106,879 and 4,123,183 disclose various forms of self-erecting roadway delineator or marking posts.

In the design of such a marking post, it is highly desirable for the post to be constructed in a manner to be able to withstand many dozens of impacts from the bumpers of high speed vehicles without damaging or destroying the post and without pulling the post out of the ground.

The prior art patents are thus seen to propose mechanical solutions in form, fit and function. The present invention enhances the rebounding performance of a delineator via a blended compound of polymeric materials. The high cost of high performance polymers proposed in the prior art is challenged in the present invention because the present invention is blended using economical ingredients and also provides a sustainable environmental/carbon foot print reduction benefit. The series of compounds proposed, offer an economical solution while maintaining a controllable, graded level of performance ability to rebound from impact, ranging from high to low.

SUMMARY OF THE INVENTION

We have discovered how to manufacture road markers and highway delineators from a compounded mixture of polymers and pulverized or micronized rubber powder, using a multi-layer plastic extrusion process on industry standard plastic extrusion equipment.

Utility line markers, road markers and highway safety delineators are used along roads and highways to mark road boundaries, exits and underground service pipes or cables.

The problems with current delineators is their limited ability to be impacted by a car at 55 mph or farm implement, and return to the vertical position at cold or elevated temperatures.

The cost of delineators or posts of current design: ranging from standard commodity thermoplastics to expensive performance based polymers—such as TPU (Thermoplastic Polyurethane) is reduced by using available lower cost, recycled tire and scrap rubber powder sources. There are approximately 300 million scrapped tires annually. Thus our invention uses environmentally friendly micronized scrap and tire rubber powder as the basis for these products.

The finished tube or flat delineator is protected from deteriorating from ultra-violet rays from the sun, by a multi-layer thin cap coat cover of a polymer and color concentrate. (See attachment of color concentrate data sheet)

We have discovered that the blending of various levels of micronized/non-micronized rubber; recycled and or virgin blends into a formulated array of thermo set/thermoplastic blends to achieve economical performance results for impact regardless of shape, attachment method or spring back mechanisms. The micronized rubber particles act as a filler to make an un-extrudable thermo set/thermoplastic blend more viscous and thus extrudable. It is the excellent filler loading acceptance and the elasticity performance nature of Vistamax3020 or equivalent (Propylene-based Elastomer, using ExxonMobil Chemical's EXXPOL Catalyst Technology or equivalent) that we are providing.

Our invention uses the mechanical compounding nature of the materials and the dispersion rate of the rubber that can be achieved. As set forth in the Struktol RP28 Processing Additive Technical Data Sheet: "With the addition of Struktol RP28 compounding additive, the homogeneity of elastomers of different polarity and viscosity is rapidly absorbed by the polymers' during the mixing cycle. At process temperatures, Struktol RP 28 melt has a natural tackiness and this adhesive nature enables it to act as an effective binder; among the rubber powder and polymer components." The multi-layer portion of our invention provides an encasement that allows the tacky nature of the bulk of the profile/tube to slip through sizing equipment. The multi-layer cap coat also acts as a color concentrate reduction benefit, in addition to providing an adhesive surface for existing tapes used for reflectivity.

In addition, our blending of rubber/thermoplastic can serve in the delineator base applications as well. Not only does the blend provide an economic advantage over virgin rubber but it also enables a stronger chemical bond (with the use of compatibilizers) with the butyl adhesive or epoxy that is used to adhere the base to the pavement. A principal object of our invention is the use of lower cost materials in the composition namely, the use of micronized recycled rubber as a filler, in these applications.

Another object of our invention is the provision of a reduced and sustainable carbon foot print of emissions for virgin rubber and the repurposing of some of the large amount of tire scrap accumulating each year around the world.

Another object of our invention is the provision of a composition which itself is recyclable so that, for example, a highway delineator can be recycled by being blended back into new delineators without loss of performance in the new delineators.

Another object of the invention is the provision of a composition which can be formed into an elongated flexible tube or profile of resilient thermoplastic/thermo set plastics filled with a rubber blend filler.

Another object of the invention is the provision of a composition which can be extruded into a shape and which is then capable of being repetitively bent through an angle of 90 degrees and of returning to an upright straight position.

In order to duplicate impact testing results; we have tested the 90 degree flexure via a modified test apparatus used in ASTM D2444-99. The falling TUP test utilized a 20 lb, smooth face TUP, dropped repetitively from a height of 11 feet, impacting and passing through the horizontal test sample 18" from the mounted base and flexing it to a 90 degree bend. The velocity of the impact was calculated at 57 MPH. The test specimens measured 42" in length. Ref ADOT's Study. Oct. 20, 2006 by Seth Chalmers. The delineator continuously returned to origin. Another object of the invention is the provision of a formed performance base for highway delineators consisting of a resilient thermoplastic/thermo set plastic filled with micronized rubber blend filler.

Another object of the present invention is the provision of a composition which can be used in existing mechanical designs, without modification of existing form, fit, and function, The invention is a compounded blend of materials which can be used to make all existing delineator structures as well as new designs which are yet to be approved. These blends include a matrix of micronized rubber particles (either virgin or recycled) ranging from 1% to 90% load capacity depending on performance desired enveloped into a blend of thermoplastic or thermo set polymer blends. The theory behind the envelopment of rubber particles into a thermoplastic or thermo set blend is to provide the viscosity required to extrude the material through existing extrusion and sizing equipment. In addition; the micronized rubber powder will act as a filler reducing cost of performance related thermoplastics/thermosets without reducing performance. The invention may or may not utilize a cap stock material to enable processing of the performance portion of the internal blend mix. The cap stock material may also serve as a means to reduce color concentrate cost required to customize the tube per customer specifications. The cap stock material may also be used for the adhesion of reflective tape, in addition to UV protection.

Another object of the present invention is the provision of a cost effective performance based rubber/thermoplastic blend in the manufacturing of the base. It is noted that virgin rubber is an expensive solution for the impact properties desired and performance required. The compounded blend will still offer comparable performance results at an economical value.

Another purpose of the present invention is the provision of a compounded blend that will enable a successful performance drive over test for a utility line marker. An attribute needed for underground line markers, used in the utility industry for identifying the location of underground line marking. Numerous underground utility line markers are damaged by farm implements that knock the existing line markers over; eliminating their visual purpose. The blend of our invention will allow the line markers to rebound back to a vertical position; still visible for their intended purpose.

Another key feature of the invention is the sustainability initiative realized to reduce rubber scrap and carbon foot print emissions and energy required to produce virgin rubber. From an EPA perspective the Scrap Tire Management Council estimates 266 million scrap tires per year were generated in the United States in a 1996 survey. (Scrap Tire Use/Disposal Study, 1996 Update, April 1997). This invention provides a valued use for scrap tire disposal. In the future, all delineators may require a percentage of scrap tire rubber in their content as a preference.

DETAILED DESCRIPTION OF THE INVENTION

Figure 1:
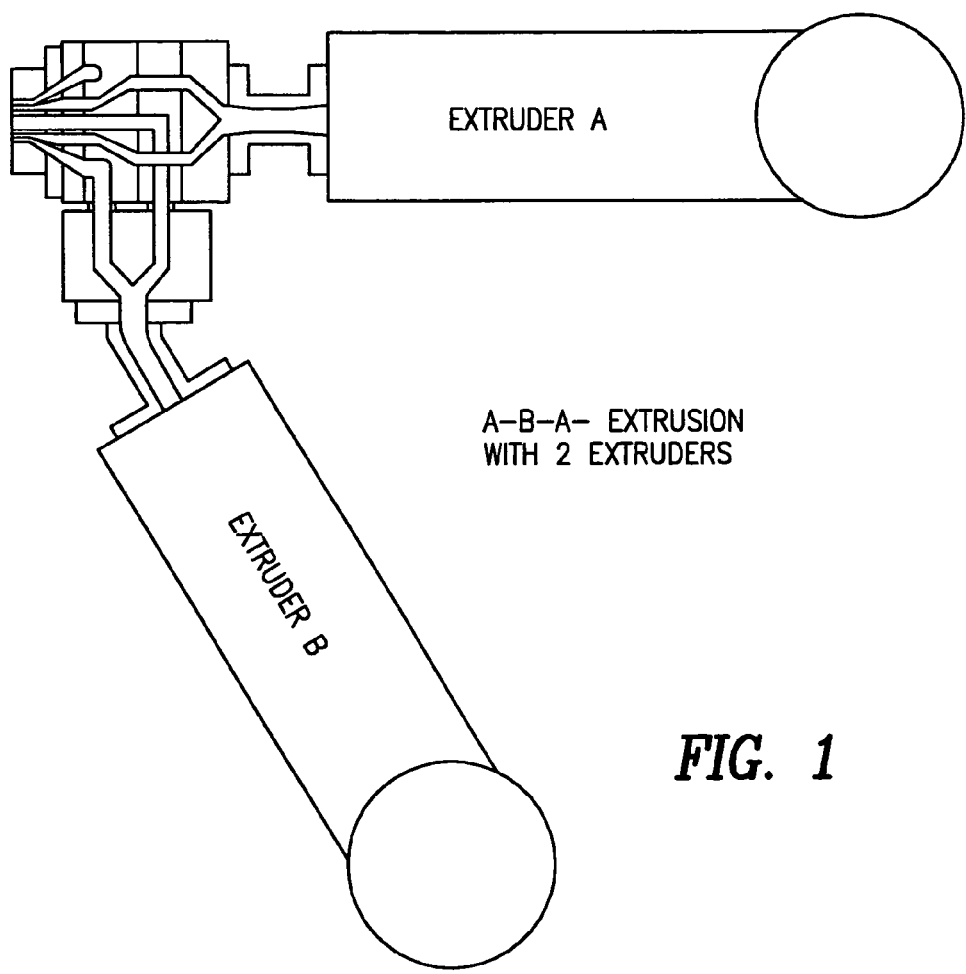
FIG. 1 is a block diagram of a co-extrusion operation using two extruders.

The present invention includes a mix of micronized rubber from Lehigh Technologies 120 Royal Woods Court SW, Tucker, Ga. 30084 and Vistamaxx™ propylene based elastomers from ExxonMobil Chemical Company, 13501 Katy Freeway, Houston, Tex. 77079-1398. The invention may also include a combination of color concentrate and compatibilizer from Struktol Corp. 201 E. Steels Corners Road, P.O. Box 1649, Stow, Ohio 44224-0649 and a powder form of linear low-density polyethylene ("LLDPE"). There are varying degrees of performance and cost targets which may be met adding and subtracting portions of the ingredients of the mix.

The addition of a cap coat with a Vistamaxx3020™ or equivalent molecular blend/loading allows for adhesion of the two layers in the multi-layer extrusion process and also allows both layers to exhibit like performance of elasticity upon impact. The high density polyethylene ("HDPE") provides a stiffening property to the matrix and may be varied depending upon performance and usage. Higher levels of Vistamaxx™ or similar, may be used depending on the field purpose of the delineator. In addition varying melt viscosities may be used in any of the layers, depending on performance desired.

Construction zone delineators suffer numerous impacts and may or may not require a higher loading or concentration of Vistamaxx™ or equivalent for performance purposes.

It has been determined that micronized powder meshes of all components are optimum in homogeneous mixing. It has also been noted that continuous mixing to the throat of the extruder is important to keep a proper proportional balance. In addition, it has also been determined that different melt flow ranges of the materials in the ingredient blend will provide for a homogeneous blend encapsulating the rubber particles and in turn providing performance optimization. It has also been determined that the addition of Maleic Anhydride in the form of, MAPE, (Maleated Polyethylene, MAPP (Maleated Polypropylene) or maleated natural rubber may enhance the performance characteristics allowing for higher loading content of rubber greater than 50%. This is disclosed in Highly filled thermoplastic elastomers from ground tire rubber, maleated polyethylene and high density polyethylene, by A. R. Kakroodi and D. Rodriguez. Plastics, Rubber and Composites 2013 Vol 42 No 3 page 115-122

Cap Coat
1. HDPE (Nexeo, 11720 Grand Ave, Northlake, Ill. 60164)
2. LLDPE (Nexeo)
3. ExxonMobil Chemical Company Vistamaxx™ (3020FL Prod pellets)
4. Struktol Co of America, Stow, Ohio Rubber Compatibilizer RP 28
5. Color Concentrate Sub Layer Rubber Content
1. Lehigh Technologies micronized rubber powder at 40 mesh
2. ExxonMobil Vistamaxx™ (3020FL Prod pellets)
3. LLDPE Powder (Nexeo)
4. Struktol Corporation compatibilizer RP 28

Testing

The following blends were tested at a 50%+/−2% target focal point for rubber content and performance results based upon a 90 degree flex test.

1.) 48% Lehigh Micronized Rubber: 48% Vistamaxx 3020 or equivalent: 2% Struktol Compatibilizer: 2% Color Concentrate
2.) 48% Lehigh Micronized Rubber: 36.5% Vistamaxx 3020 or equivalent: 11.5% LLDPE: 2% Struktol Compatibilizer: 2% Color Concentrate
3.) 48% Lehigh Micronized Rubber: 24% Vistamaxx 3020 or equivalent: 24% LLDPE 2% Struktol Compatibilizer: 2% Color Concentrate.
4.) 48% Lehigh Micronized Rubber: 11.5% Vistamaxx 3020 or equivalent: 36.5% LLDPE: 2% Struktol Compatibilizer: 2% Color Concentrate.

All Blends were encased in a 48/48 blend of HDPE-Nistamaxx 3020 or equivalent Cap Coat with max cap wall of 0.030" to min wall of 0.015", 4% blend of color concentrate and Struktol compatibilizer. Variations of Cap coating ingredients may and or will apply according to impact performance requirements and UV weathering requirements, per customer requirements or field recommendations.

The chemical names for the above ingredients are:
Micronized Rubber=mixture of natural and synthetic rubbers, carbon black, fillers and oils;
Vistamaxx=propylene-based elastomer;
Compatabilizer=mixture of light color aliphatic hydrocarbon resins.

Method of Mixing Materials

The preceding material blends were measured per weight and percentage calculations using a 5000 lb Fairbanks scale for the heavier components, subtracting tare weight of the container used. The lighter components color concentrate and compatibilizer components were measured per weight and percentage calculations on a Howe 50 lb capacity scale, subtracting tare weight of the container used. All materials were blended to a uniform blend in a 3000 lb capacity Prater Twin Auger Pulverizer/Mixer and portioned into plastic lined gaylords. Prior to line loading the main extruder; the rubber blend was processed through a Con Air Model D-100A incandescent dehumidifying drier to remove moisture.

Method of Manufacturing

Figure 2:
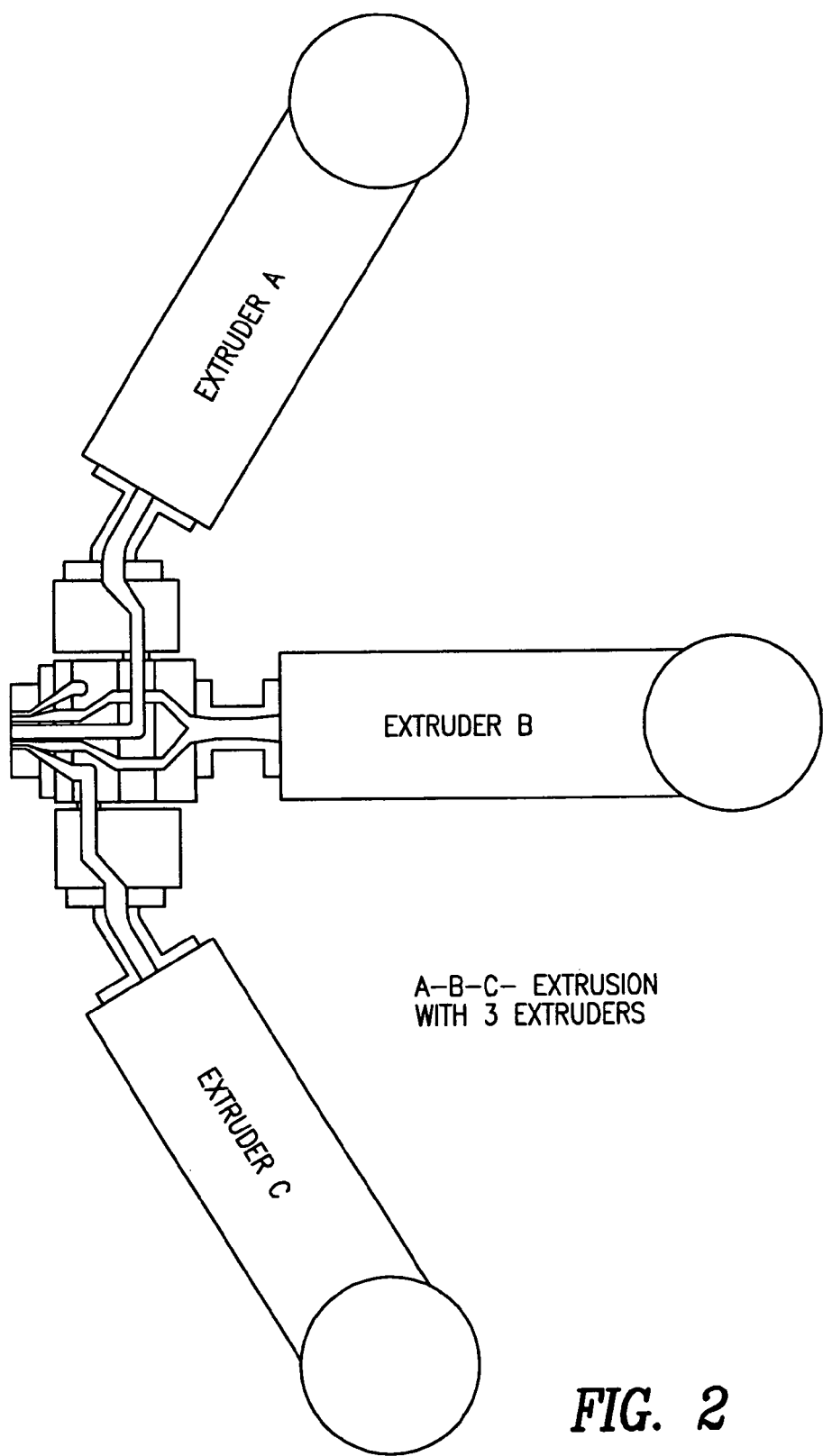
FIG. 2 is a block diagram of a co-extrusion operation using three extruders.

Multi-layer extrusion process was used to fabricate test samples. As shown in FIG. 1, extruder B is a 62 centimeter American Maplan Twin Screw Extruder; providing an inner matrix of 48% micronized rubber, 48% Vistamaxx and 4% color concentrate/Struktol compatibilizer blend. Extruder A is a 3½ NRM Single Screw; providing an outer cap coat application of 48% HDPE, 48% Vistamaxx and 4% Color Concentrate and Struktol compatibilizer blend. Processing temperatures were set in accordance to manufacturers' specifications and output speeds. In addition, as shown in FIG. 1, the die design/extruder layout may encompass an ABA variant into the processing of a finished part where A is the same material on the outside as the inside and B is the center material of rubber blended composition. As shown in FIG. 2, an ABC layered concept may be utilized in the extrusion process, encompassing three or more extruders to provide multiple layers from inside to outside.

NTPEP Testing

The NTPEP (National Transportation Product Evaluation Program) has listed the following work plan for field testing Flexible Ground Mounted Delineator Posts.

Test Procedures:

Sample size of ten units were tested in the following way:

Eight flexible ground mounted posts installed by the manufacturer (four installed manually and four installed mechanically). The delineators will be hit ten times (four posts for glancing bumper hits and four posts for wheel hits). A standard sedan with a bumper height of approximately 18" while traveling at a speed of 55+/−2 mph will be used for impact testing. Five of the impacts will be at an ambient temperature of 32+/−5 degrees F. and the remaining five impacts at an ambient temperature of 85+/−5 degrees F. The test vehicle shall impact four of the posts at an angle perpendicular to the front of the posts. The same test samples will be used for the ten hits. Two flexible posts will be used for weatherometer testing. A glancing hit is defined as one on the bumper near the vehicle headlight. The delineators shall be installed a minimum of eight hours prior to being hit.

Testing Observations

The testing agent will inspect each post after each impact and document the following:
1. Any splits, cracks, breaks or other forms of deformation or distress.
2. The percent list to vertical two minutes after each impact.
3. The approximate percentage of the reflective area that is damaged after each impact to an extent it no longer performs as intended.
4. Any problems or comments associated with the installation and removal of the posts and bases. The testing agent will document any special equipment or techniques required for installing or removing the posts and bases.

It is a standard test procedure to impact the delineator at a speed of 55 MPH in an automobile at an impact height of 18" (bumper height). The test samples using the composition of the present invention was tested in accordance with the ASTM D2444-99 Standard Test Method for determining impact resistance on thermoplastic pipe and fittings by means of a TUP (Falling Weight).

The testing apparatus used was in conformance with the apparatus described in Paragraph 4 of the above ASTM Standard Test Method. The drop tube used was in accordance with paragraph 4.3.1 was approximately 12 foot in length/height, providing for a fall of at least 11 ft. or 3.3528 meters. The TUP nose detail is shown as TUP A on page 2 of the test procedure. The mass of the TUP weight was 20 lbs.

The velocity of the impact at 57 MPH was calculated as follows:

Formula: The square root of (a+b) yields impact speed in meters per second where as:
A=Initial Speed=0 (squared)
B=Height Meters×2×9.8 meter/second (squared)
Note: Height=11 feet or 3.3528 meters
B=3.3528 meter×2×9.8 meters squared=644
Square root of 644=25.47
MPH=(square root in meters)×2.2369 or 25.47×2.2369=56.97 MPH Impact Speed Test Specimens Each tube specimen generated for testing measured 6" in length and 0.00" in Outside Dimension. Wall thickness ranged in the 0.165" to 0.175".

A minimum of 20 samples were tested for preliminary tests and a minimum of 100 samples were tested at the optimum level of performance 48% Vistamaxx™.

Specimens were allowed to cool for a period of 24 hours to reach ambient room temperature before being tested. In addition, it was important to gain equal knowledge of performance upon samples that had been placed in a freezer overnight to a temperature of 20 degrees F. Upon removal from the freezer each sample was tested within 60 seconds after removal.

All test specimens including 48% rubber passed the impact TUP test at room temperature and at the 20 degrees F. marker; at 120 ft/lbs using ASTM Spec D 2444-99 apparatus. No cracks observed.

Tensile Strength and Elongation
Testing

Bow Tie specimens (performance rated) were cut from extruded delineator post samples for the purpose of evaluating elasticity. Ambient room temperature samples were placed within the Tinius Olsen Locap Electromatic Compression & Tensile Testing Machine apparatus for testing and the elongation speed was set for expansion rate of 2 inches per minute. The 2 inch mark spread to 11 inches before failure and breakage occurred yielding a 11/2=450% elongation The performance rated bow tie specimens consists of:
Inside substrate—
33% rubber—Pulverized or micronized scrap rubber;
67% LDPE—Low Density Polyethylene and I.E. PVC, Polyethylene, Polypropylene, ABS, metallocene. ½ pph of RP28 (compatibilizer) This component permits extrusion of the rubber and permits it to adhere to another plastic.
Outside Capcoat—LDPE GA 818-073/ExxonMobil 3020FL (but will change depending on the application).
The compatibilizer used is a hydrocarbon resin offered by Struktol Company of America, 201 E. Steels Commerce Road, Stow, Ohio, 44224 sold as "Struktol RP28".
The rubber is the mixture of natural and synthetic rubbers, carbon black, filler and oils called "Micronized Rubber Powder" sold by Lehigh Technologies, LLC 120 Royal Woods Court SW, Tucker, Ga. 30084

Road markers and highway delineators are described in detail in the following websites: This is the opening page of the web site for National Transportation Product Evaluation Program
http://www.ntpep.org/Pages/default.aspx
This is the link to the reports on testing.
http://www.ntpep.org/Pages/TTCDReports.aspx
This is the opening page for the Manual on Uniform Traffic Control Devices
http://mutcd.fhwa.dot.gov/kno_2009r1r2.htm
This is the link to Manual on Uniform Traffic Control Devices regarding Delineators.
http://search.fhwa.dot.gov/search?q=delineator&btnG=Go&ie=&site=fhwa_web&output=xml_no_dtd&client=fhwa_web&lr=&proxystylesheet=fhwa_web&oe=&as_sitesearch=mutcd.fhwa.dot.gov.
Length Determination: http://www.azdot.gov/tpd/atrc/pdf/delineator-marker_prequal_process.pdf In 1988, a study entitled "Optimization of Post Delineator Placement from a Visibility Point of View" was published in the Transportation Research Record 1172. This study indicated that delineators with long and narrow (18"×1") prismatic sheeting reflector tabs spaced every 350 to 400 feet at a lateral offset of 10 to 14 feet at a mounting height of 42 inches provides the optimal roadway delineation. Subjective research conducted by Potters Industries (maker of glass beads) in the 1980's also had similar findings. ADOT's own field demonstrations of the longer and narrower reflector tabs enable the delineator to reflect light back more effectively, almost at any distance Further modifications to the methods and apparatus of the invention may be made without departing from the spirit and scope of the invention.

We claim:

1. An extrudable durable composition which retains its shape in finished products comprising: 48% micronized rubber; between 48% and 11.5% propylene-based elastomer; 2% compatabilizer; and 2% color concentrate.

2. The extrudable composition of claim 1 further including between 24% and 36.5% linear low density polyethylene.

3. An extrudable flexible composition for use in articles which return to their original shape when deformed comprising: between 1% and 90% by weight of micronized rubber, a propylene-based elastomer, and a compatabilizer.

4. The extrudable flexible composition of claim 3 wherein said micronized rubber is a mixture of natural and synthetic rubbers, carbon black, filler and oils.

5. The extrudable flexible composition of claim 3 wherein said compatabilizer is a mixture of light color aliphatic hydrocarbon resins.

6. The extrudable flexible composition of claim 3 further including linear low density polyethylene.

7. The extrudable flexible composition of claim 3 wherein the micronized rubber is present at a level which is within the range of 1 weight percent to 50 weight percent.

8. The extrudable flexible composition of claim 3 wherein the micronized rubber is present at a level which is within the range of 50 weight percent to 90 weight percent.

9. The extrudable flexible composition of claim 8 wherein the propylene-based elastomer is present at a level which is within the range of 11.5 weight percent to 48 weight percent.

10. The extrudable flexible composition of claim 9 wherein said composition is further comprised of linear low density polyethylene.

11. The extrudable flexible composition of claim 10 wherein the linear low density polyethylene is present at a level of about 2 weight percent.

12. The extrudable flexible composition of claim 11 wherein the compatabilizer is present at a level of about 2 weight percent.

13. The extrudable flexible composition of claim 12 wherein the compatabilizer is comprised of a mixture of aliphatic hydrocarbon resins.

14. The extrudable flexible composition of claim 13 wherein the micronized rubber, the propylene-based elastomer, the linear low density polyethylene, and the compatabilizer are mixed in an extruder with the mixing being conducted continuously to the throat of the extruder.

15. The extrudable flexible composition of claim 3 wherein said compatabilizer is maleated polypropylene.

16. The extrudable flexible composition of claim 3 wherein said compatabilizer is maleated polyethylene.

17. A highway delineator which is comprised of the extrudable flexible composition of claim 10.

18. The highway delineator of claim 17 wherein the highway delineator is comprised of an inside substrate and an outside substrate, and wherein the inside substrate is comprised of the extrudable flexible composition.

19. The highway delineator of claim 18 wherein the outside substrate is comprised of low density polyethylene.

20. The highway delineator of claim 19 wherein the outside substrate is further comprised of a compatabilizer which is a mixture of aliphatic hydrocarbon resins.

\* \* \* \* \*